United States Patent [19]

Giard, Jr.

[11] Patent Number: 5,326,006
[45] Date of Patent: Jul. 5, 1994

[54] ACCESSORY HOLDER AND ASSOCIATED BOTTLE FOR BICYCLES

[75] Inventor: Edward H. Giard, Jr., 1653 Imperial Cir., Naperville, Ill. 60563

[73] Assignee: Edward H. Giard, Jr., Naperville, Ill.

[21] Appl. No.: 883,091

[22] Filed: May 15, 1992

[51] Int. Cl.$^5$ .......................... B62J 7/06; B65D 23/00
[52] U.S. Cl. ................................ 224/32 R; 224/35; 224/39; 215/1 C
[58] Field of Search ............... 224/148, 32 R, 35, 39; 215/1 C; 248/311.2, 313

[56] References Cited

U.S. PATENT DOCUMENTS

| | | | |
|---|---|---|---|
| D. 316,389 | 4/1991 | Wood et al. | D12/158 |
| 3,920,140 | 11/1975 | Kiser | 224/32 R |
| 4,386,721 | 6/1983 | Shimano | 224/39 |
| 4,421,804 | 12/1983 | Mori et al. | 215/1 C |
| 4,441,638 | 4/1984 | Shimano | 224/35 |
| 4,606,523 | 8/1986 | Statz et al. | 248/311.2 |
| 4,754,902 | 7/1988 | Opfergelt | 224/148 |
| 4,784,360 | 11/1988 | Mok | 248/313 |
| 4,828,211 | 5/1989 | McConnell | 248/311.2 |
| 4,830,239 | 5/1989 | Tackles | 224/35 |
| 4,830,240 | 5/1989 | Tackles et al. | 224/35 |
| 4,883,205 | 11/1989 | Saelens et al. | 224/32 R |
| 5,007,566 | 4/1991 | Fick | 224/32 R |
| 5,024,358 | 6/1991 | Reichert | 224/35 |
| 5,040,709 | 8/1991 | Neugent | 224/35 |
| 5,060,832 | 10/1991 | Link | 224/32 R |

FOREIGN PATENT DOCUMENTS

| | | | |
|---|---|---|---|
| 2615158 | 5/1987 | France | 224/39 |
| 2647411 | 11/1990 | France | 224/32 R |

*Primary Examiner*—Linda J. Sholl
*Attorney, Agent, or Firm*—Welsh & Katz, Ltd.

[57] ABSTRACT

A plastic bottle and bottle holder for mounting on bicycles. The holder has an enclosure section with pincer arms which encircle the bottle and cooperate with grooves in the bottle to releasably retain the bottle on the bicycle.

5 Claims, 3 Drawing Sheets

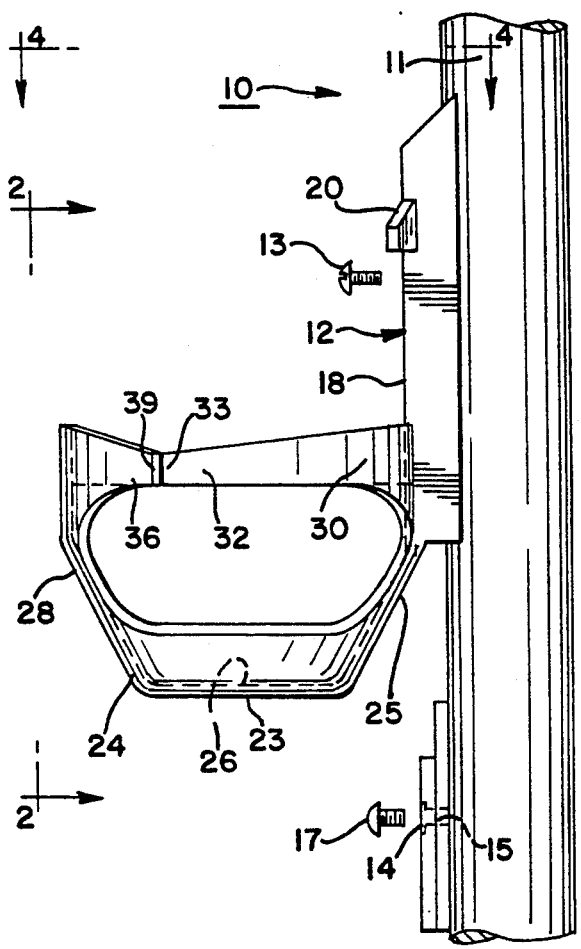
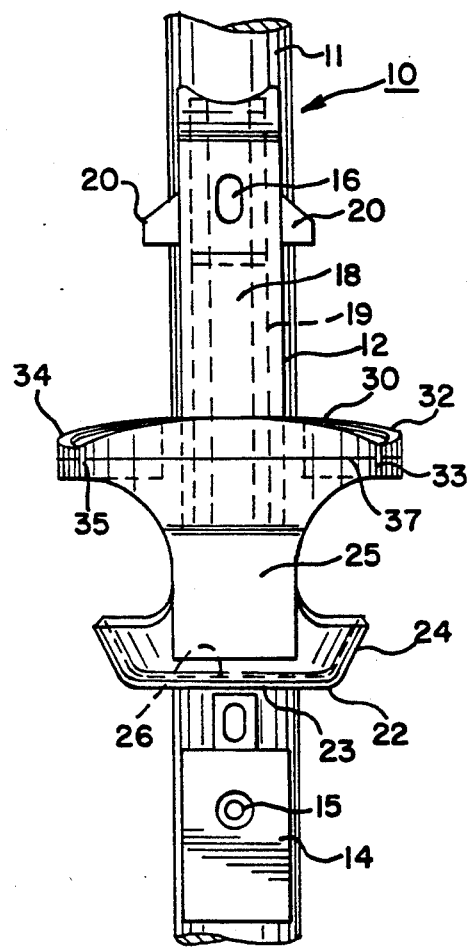

FIG.6
FIG.7
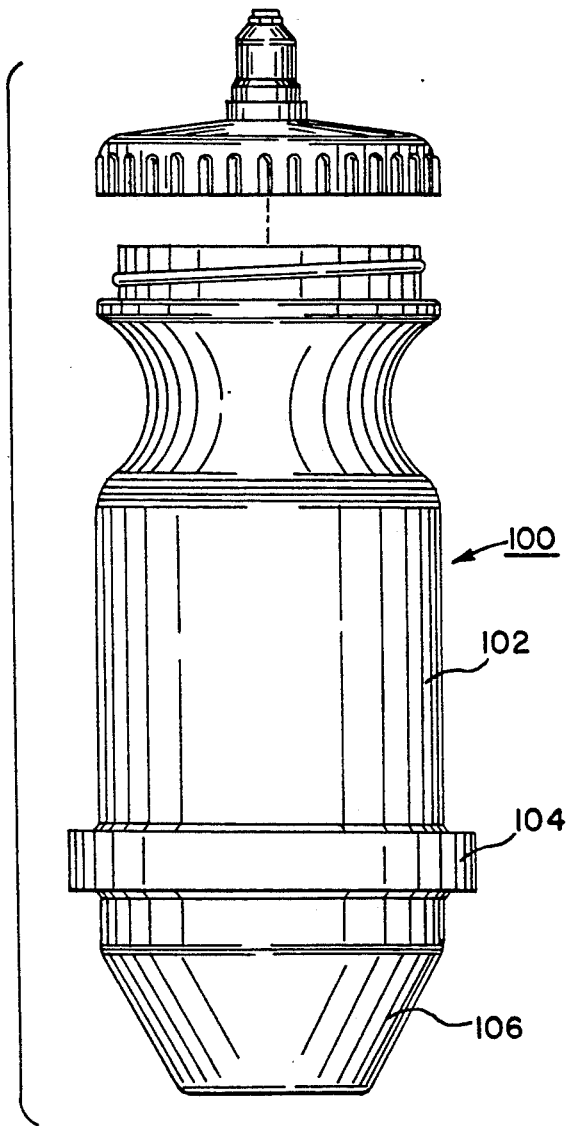
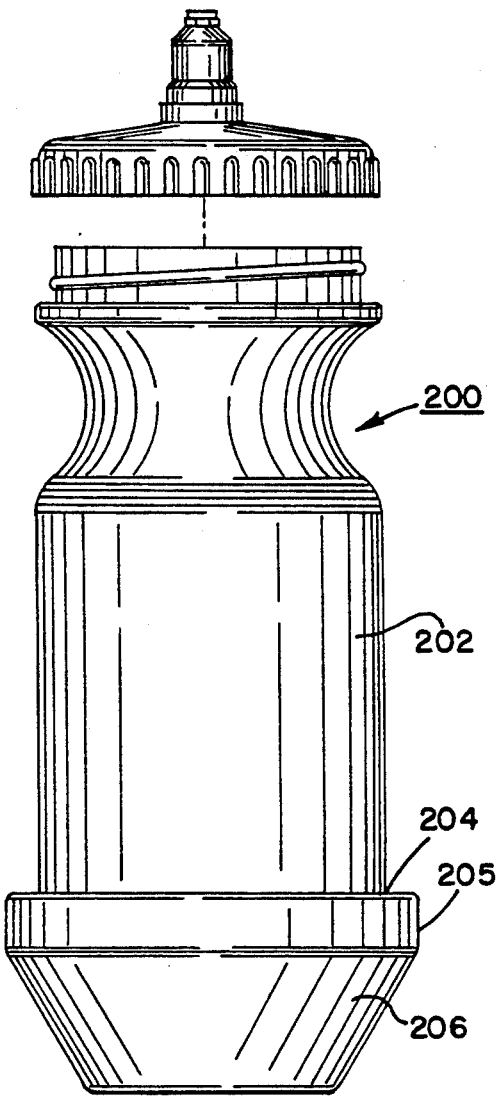

ACCESSORY HOLDER AND ASSOCIATED BOTTLE FOR BICYCLES

BACKGROUND OF INVENTION

1. Field of Invention

The present invention relates generally to specialized holders and bottles adapted for mounting on bicycle frames. More specifically, the present invention includes an improvement from conventional bottle holders to protect the bottle and securely hold a bottle in place.

2. Background of Invention

Recreational and competitive cycling has grown in popularity in the last decade. Along with this explosive growth, a demand for bicycle accessories has also risen. One desirable accessory for cycling long distances is a water bottle allowing a cycler to carry cooling liquids such as water to replenish fluids lost through long periods of riding. In order to meet this need, designers have produced mounting structures for the easy removal and storage of water bottles on the bicycle frame itself. The requirements for such bottles and corresponding holders are that they be light, easily accessible to the rider, and able to withstand a certain amount of shock due to riding. These holders also may be used to hold other accessories such as tool kits or small storage devices.

One common type of water bottle holder consists of a metal cage which may be mounted directly to the bicycle frame. The cage is bent around the shape of a cylindrical bottle and holds the bottle in place by friction. This design suffers from the disadvantage of scratching the bottle since holding the bottle in place requires pressure contact with the metal cage. Designers attempted to solve this problem by constructing the frame out of resilient plastic. However, prior plastic bottle holders still require the bottle to be pulled in a direction parallel to the tubular frame member on which the unit is mounted, which may be cumbersome and distracting to the rider.

SUMMARY OF THE INVENTION

The invention is directed toward a unique and new bottle and holder for mounting on bicycles. The invention includes two components -- a molded plastic holder and a molded plastic bottle. The holder has an elongated base member which may be slidably attached to a mounting bracket attached to a bicycle frame member. Attached to the base member is a bottle support member having a circular, flat bottom with outwardly flared sides forming a frustoconical cap. A bottle enclosure member is located substantially parallel to the base member and attached to the bottle support member. A first generally arcuately shaped resilient pincer is mounted normal to the base member at its center point, the pincer has two equal length arms extending outwardly toward the bottle enclosure member. The bottle enclosure member includes an extension arm which is attached to a second generally arcuately shaped resilient pincer whose ends extend toward the ends of the first pincer arms. The first and second generally arcuately shaped pincers form a substantially circular enclosure.

The holder is mated with a bottle which is generally cylindrical in shape. The bottle has a downwardly tapering frustoconical base section, corresponding in shape to the frustoconically shaped depression of the bottle support member. The bottle has a generally cylindrical center section which has a larger diameter than the diameter of the circular enclosure formed by the first and second pincers. The center section of the bottle has an annular groove to receive the first and second pincer arms of the holder.

The bottle's frustoconical base section is axially inserted into the holder, forcing the first and second pincer arms apart by a camming action of the pincer arms, which then snap into the annular groove, locking the bottle in place. The bottle may be removed by pivoting the bottle to either side, the sides of the bottle spreading the resilient pincer arms to release them from the annular groove and free the bottle.

Accordingly, it is an object of the present invention to provide a water bottle and holder which may be easily removed and accessible to a bicycle rider.

It is another object of the present invention to provide a water bottle holder which will not damage the water bottle through removal and installation.

It is another object of the invention to provide a water bottle which may be removed by a camming action side-to-side.

It is yet another object of the present invention to provide a water bottle and holder which will securely grip a water bottle while being carried in transit.

It is yet another object of the present invention to provide a water bottle which may be mounted so that its center section may be almost entirely visible to display advertising or promotional material.

These objects and other advantages may be realized in the water bottle described below.

BRIEF DESCRIPTION OF THE DRAWINGS

FIG. 1 is a side elevation of a bottle holder embodying the present invention.

FIG. 2 is a view of the bottle holder of FIG. 1, taken along line 2—2 of FIG. 1.

FIG. 6 shows an alternative embodiment of the bottle.

FIG. 7 shows a second alternative embodiment of the bottle.

DETAILED DESCRIPTION OF THE PREFERRED EMBODIMENTS

Figure 5:
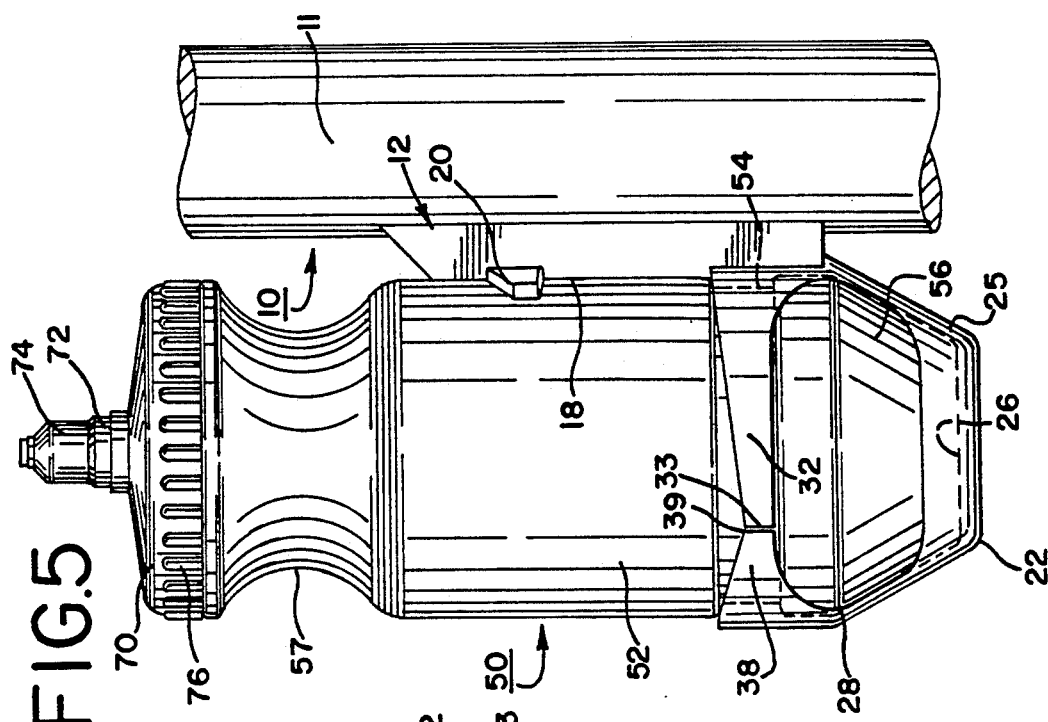
FIG. 5 is a side elevation of the assembly of the bottle and bottle holder.
Figure 4:
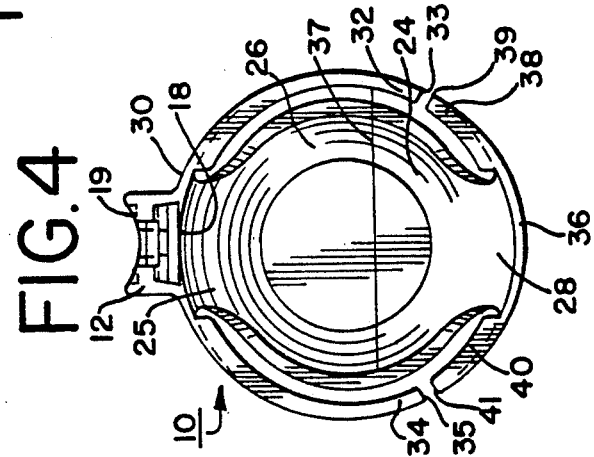
FIG. 4 is a top view of the bottle holder of FIG. 1 taken along line 4—4 of FIG. 1.

FIGS. 1 and 2 are a side and front view of bottle holder 10. The preferred embodiment of the bottle holder 10 is made from one-piece injected molded plastic for convenience of manufacturing. Of course other methods may be used and the holder may be fabricated in separate pieces.

Bottle holder 10 is made of base member 12 which may be slidably mounted to mounting bracket 14. Both mounting bracket 14 and base member 12 are attached to tubular bicycle frame member 11. Mounting hole 16 is defined through base member 12. Bolt 13 is secured through mounting hole 16 to frame member 11 at a suitable attachment point such as a "braze-on." T-shaped slot 19 is formed in the base member 12 to slidably mate with corresponding T-shaped mounting bracket 14. Mounting bracket 14 is also secured to frame member 11 by bolt 17 through mounting hole 15 to frame member 11. Other means such as screws or rivets may be used to secure the holder 10 to bicycle frame 11.

Figure 3:
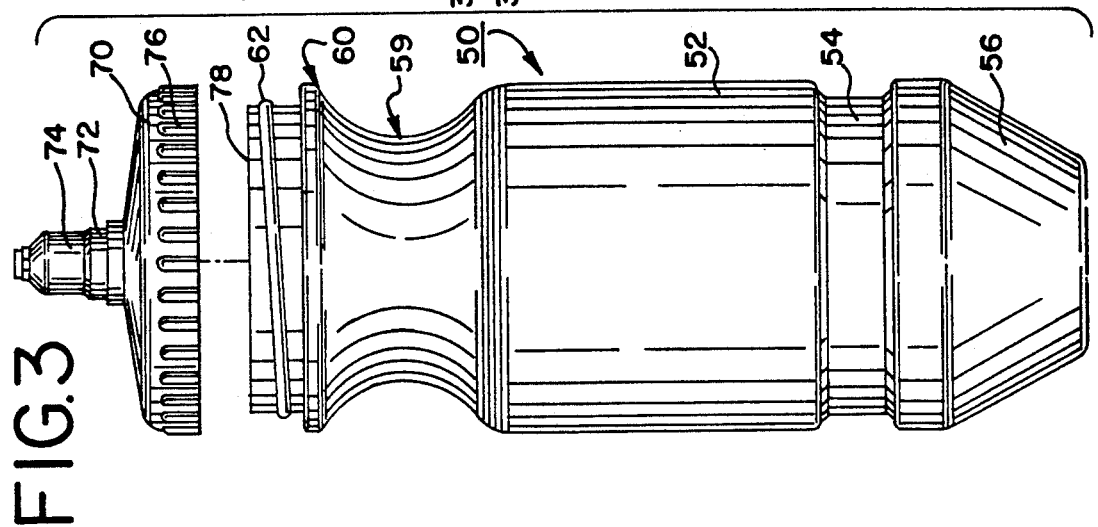
FIG. 3 is an elevation of the bottle embodying the present invention.

Face 18 of base member 12 is curved along a concave cylindrical shape to follow the configuration of center section 52 of the bottle shown in FIG. 3. Stabilizing extensions 20 are formed near the top of base member 12.

Bottle support 22 has a flat circular face 23 with outwardly extending flared walls 24 to form frustoconical depression 26. Bottle support 22 is connected to base member 12 by extension arm 25. Bottle support 22 is also connected to bottle enclosure member 28 which is substantially parallel to base member 12.

A first generally arcuately shaped resilient pincer 30 is attached at its median point to base member 12. A second arcuately shaped resilient pincer 36 is attached at its median point to bottle enclosure member 28. First pincer 30 has a total arcuate length of approximately 240 degrees. Pincer 30 includes two arms 32 and 34, each having an arcuate length of approximately 120 degrees. Arms 32 and 34 are tapered toward their respective arm ends 33 and 35 to reduce structural rigidity at ends 33 and 35. The resilient plastic which forms these arms is flexible and arms 32 and 34 may be displaced or flexed somewhat by applying outward pressure to them.

Similarly, second pincer 36 has an arcuate length of approximately 120 degrees and is attached at its midsection to bottle enclosure member 28. This pincer includes two separate arms 38 and 40, each of which are approximately 60 degrees in arcuate length. Like the first set of arms, these arms 38 and 40 are tapered toward their respective ends 39 and 41. Arms 38 and 40, along with bottle enclosure member 28 may be flexed somewhat. Of course, it is understood that first and second generally arcuately resilient pincers 30 and 36 may be of variable arcuate lengths and have different shapes than those disclosed herein.

The natural position of arms 38 and 40 is such that their ends 39 and 41 touch or almost touch the ends 33 and 35 of arms 32 and 34 so a small gap separates arms 38 and 32 and arms 40 and 34. A substantially circular enclosure or band is formed by and inside first and second pincers 30 and 36 having a diameter 37. Although the preferred embodiment of the holder 10 is injection molded plastic, other materials may be used as long as they are somewhat flexible.

Bottle 50 used with bottle holder 10 is shown in FIG. 3. Bottle 50 is has a generally cylindrical center section 52, frustoconical base section 56, and collar section 60.

Collar section 60 includes mouth opening 58 for removal or insertion of liquids or ice and screw thread 62 to which cap 70 is attached. Cap 70 may be secured to collar section 60 by screwing cap 70 to threads 62. Cap 70 has a number of protruding ridges 76 to aid a user in gripping cap 70. Cap 70 is provided with spout 72 which has slidable nozzle 74. Other configurations may be used to attain access to the liquid in bottle 50. For example, a straw may be substituted for or incorporated with nozzle 74 and spout 72.

Center section 52 includes an engaging means of annular groove 54 which is located near base section 56. The center section 52 of the bottle 50 is generally cylindrical with a diameter which is greater than the diameter 37 formed by the interior surfaces of first and second pincers 30 and 36. The diameter of the annular groove 54 is slightly larger than diameter 37 of the pincers 30 and 36 which allow pincers 30 and 36 to snugly fit within annular groove 54 and hold the bottle 50 in bottle holder 10. Base section 56 of bottle 50 has a frustoconical shape which is complimentary to the frustoconical depression 26, so when bottle 50 is installed within bottle holder 10, base section 56 is mated to frustoconical depression 26 of bottle support member 22. Collar section 60 of bottle 50 includes constricted portion 59 which allows the user to easily grasp the bottle. For aesthetic reasons, the shape of this section may be varied from that shown in this embodiment. Bottle 50 may be formed of blow molded plastic. Other materials and methods may be used to fabricate bottle 50. Bottle 50 may be fabricated in other shapes and forms complimentary to holder 10.

Although holder 10 is described above for use with bottle 50, other uses for holder 10 may be envisioned. For example, holder 10 may be used to hold other useful bicycling accessories such as tool kits or storage packs for easy access by a bicycle rider. Additional accessories and configurations may be used in conjunction with holder 10.

Turning to FIG. 5, bottle 50 is shown seated in bottle holder 10. Bottle 50 is inserted into holder 10 by introducing base section 56 through the circular enclosure formed by first and second pincers 30 and 36. Since the diameter of center section 52 is greater than the diameter 37 of the circular enclosure formed by the first and second pincers 30 and 36, base section 56 spreads pincers 30 and 36 apart by camming action. As the bottle 50 is pushed further into the pincers 30 and 36 and the pincers pass beyond the base section 56 and onto center section 52 of bottle 50, they snap into annular groove 54, to lock bottle 50 in place to holder 10, with base section 56 seated in frustoconical depression 26. Thus bottle 50 is engaged by the first and second pincers 30 and 36. Bottle 50 is also supported by stabilizing extensions 20. As may be seen in FIG. 5, a substantial portion of bottle 50 is unobscured by holder 10 making the bottle surface an ideal medium for display of promotional materials, advertising, and logos.

Bottle 50 may be removed or disengaged from the grip of pincers 30 and 36 by pivoting the bottle 50 to either side of holder 10 between the side gap of arms 32 and 38 or arms 34 and 40. Bottle 50 is pivoted in frustoconical depression 26 against the ends of pincers 30 and 36. Thus the gap between arms 32 and 40 and arms 34 and 40 are expanded and first and second pincers 30 and 36 may be freed from annular groove 54, allowing the user to simply pull the bottle 50 free of the bottle holder 10.

An alternative embodiment of a bottle 100 for use with bottle holder 10 is shown in FIG. 6. Bottle 100 has generally cylindrical center section 102. Bottle 100 has an annular ridge 104 adapted to engage first and second pincers 30 and 36. Center section 102 of bottle 100 has a diameter which is slightly greater than the diameter 37 formed by the first and second pincers 30 and 36. The diameter of the ridge 104 is greater than the diameter 37 of the circle formed inside pincers 30 and 36 which allow the pincers 30 and 36 to snugly fit over annular ridge 104 and hold bottle 100 in place. Bottle 100 also has a frustoconical base section 106 which is matable with frustoconical depression 26.

FIG. 7 shows a second alternative embodiment of a bottle for use with holder 10. FIG. 7 shows bottle 200 which has a generally cylindrical center section 202.

Bottle 200 has an annular shoulder 204 adapted to engage with first and second pincers 30 and 36. Center section 202 of the bottle 200 has a diameter which is slightly greater than the diameter 37 of the circle formed inside pincers 30 and 36. This allows pincers 32 and 36 to securely hold water bottle 200 about center section 202.

The aforementioned description is not to be interpreted to exclude other liquid bottle and holder arrangements advantageously employing the present invention. It is to be understood that the above described bottles and holders are merely illustrative embodiments of the principles of this invention, and that numerous other arrangements and advantages may be devised by those skilled in the art without departing from the spirit and scope of the invention.

What is claimed is:

1. A bottle and bottle holder for mounting on a bicycle comprising:
   a bottle comprising:
   a frustoconical base section;
   a generally cylindrical center section having a diameter;
   a collar section having a mouth allowing replacement or removal of liquids or ice; and
   engaging means defined in the center section of a size to releasably and securely retain a first and second generally arcuately shaped pincer;
   a holder comprising:
   an elongated base member adapted to be mounted to a bicycle frame, the elongated base member having a first end and a second end;
   a bottle supporting member extending generally normal tot he plane of the elongated base member adapted to conformingly engage the frustoconical base section of the bottle and attached to the base member by a first arm extending obliquely from the first end of the base member;
   a bottle enclosing structure extending generally upwardly from the bottle supporting member in a direction parallel to the elongated base ember;
   a first generally arcuately shaped resilient pincer connected to the elongated base member having ends extending from the elongated base member toward the bottle enclosing structure; and
   a second generally arcuately shaped resilient pincer connected to the bottle enclosing structure having ends extending from the bottle enclosing structure toward the ends of the first generally arcuately shaped resilient pincer;
   said first pincer and said second pincer forming an enclosure, the ends of said first and second pincers being generally opposed and spaced,
   whereby insertion of the frustoconical base section between the pincers will spread the pincers apart by camming action so the engaging means in combination with said first and second pincers securely lock the bottle to the holder; and
   whereby the bottle may be release by pivoting the bottle between the pincers, spreading the pincers to release the pincers from the engaging means.

2. The bottle and bottle holder of claim 1, wherein the center section is greater in diameter than the diameter of the circular enclosure formed by the first and second pincers.

3. The bottle and bottle holder of claim 1, wherein the engaging means is an annular ridge having a diameter greater than the diameter formed by the first and second generally arcuately shaped resilient pincers, such that the first and second generally arcuately shaped resilient pincers engage the annular ridge to hold the bottle in place.

4. The bottle and bottle holder of claim 1, wherein the engaging means is an annular shoulder defined in the center section to engage the pincers.

5. The bottle and bottle holder of claim 1, wherein the bottle is formed of blow molded plastic.

* * * * *